US008209272B2

(12) United States Patent
Little (10) Patent No.: US 8,209,272 B2
(45) Date of Patent: Jun. 26, 2012

(54) DYNAMIC COMPUTATION OF OPTIMAL PLACEMENT FOR SERVICES IN A DISTRIBUTED COMPUTING SYSTEM

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 660 days.

(21) Appl. No.: 12/395,459

(22) Filed: Feb. 27, 2009

(65) Prior Publication Data

US 2010/0223217 A1    Sep. 2, 2010

(51) Int. Cl.
G06E 1/00    (2006.01)
G06E 3/00    (2006.01)
G06F 15/18    (2006.01)
G06G 7/00    (2006.01)

(52) U.S. Cl. .......................................................... 706/19
(58) Field of Classification Search ...................... 706/19
See application file for complete search history.

(56) References Cited

U.S. PATENT DOCUMENTS

| | | |
|---|---|---|
| 7,065,637 B1 | 6/2006 | Nanja |
| 7,080,078 B1 | 7/2006 | Slaughter et al. |
| 7,159,224 B2 | 1/2007 | Sharma et al. |
| 7,185,342 B1 | 2/2007 | Carrer et al. |
| 7,730,172 B1 * | 6/2010 | Lewis .......................... 709/224 |
| 2002/0107949 A1 | 8/2002 | Rawson, III |
| 2003/0009545 A1 | 1/2003 | Sahai et al. |
| 2008/0263559 A1 * | 10/2008 | Das et al. ...................... 718/104 |

OTHER PUBLICATIONS

Franz Huber, et al., "Tool supported Specification and Simulation of Distributed Systems", Institut für Informatik, Technische Universität München, 10 pages, München, Germany.
Hewlett-Packard Development Company, L.P., "HP Network Node Manager Advanced Edition 7.53 Data sheet", Jun. 2008, 7 pages.
"JBossESB Requirements and Architecture, Version: 0.3," May 2, 2006, 12 pages.
King, Erik, "Perpetual Enterprise Management Service (PEMS) for Next Generation SOA-based Command & Control Systems", Jun. 2005, 49 pages.
Oasis, "Web Services Context Specification (WS-Context)," Oasis Committee draft version 0.8, Version created Nov. 3, 2004, Editors, Mark Little, et al., Copyright © 2004 The Organization for the Advancement of Structured Information Standards [Appendix A], pp. 1-23.
Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.
"Why ESB and SOA?" Version 0.3, Date: Jan. 27, 2006, 7 pages.

* cited by examiner

*Primary Examiner* — David R Vincent
*Assistant Examiner* — Ababacar Seck
(74) *Attorney, Agent, or Firm* — Lowenstein Sandler PC (57) ABSTRACT

Components of a distributed computing system are monitored, the components including hardware components and software components that operate on the hardware components. At least one of the software components is a service that includes a service level agreement. Performance characteristics of the components are determined based on the monitoring. The performance characteristics of the service are compared to the service level agreement to determine whether the service level agreement has been violated. At least one of the service or an additional service collocated with the service is migrated based on the performance characteristics of the components if the service level agreement has been violated.

18 Claims, 9 Drawing Sheets

Figure 7

DYNAMIC COMPUTATION OF OPTIMAL PLACEMENT FOR SERVICES IN A DISTRIBUTED COMPUTING SYSTEM

TECHNICAL FIELD

Embodiments of the present invention relate to distributed systems, and more specifically to optimizing a distributed computing system by migrating services and/or other software components between hardware components of the distributed computing system.

BACKGROUND

Distributed computing systems include multiple distinct services. Each service may be independent of other services, and may be accessed without knowledge of its underlying platform implementation. Each service typically operates on an application server such as a Java virtual machine.

In conventional distributed computing systems, to install a new service on a particular application server, an administrator needs to log in to the machine hosting that application server, and manually install the service thereon using a command line interface. Moreover, the administrator typically needs to personally know what machines are on the distributed system and the capabilities of those machines. This makes installing new services on the distributed computing system time consuming and error prone.

The installation of new services can be complicated by service level agreements (SLAs) that are included in the new services. A service level agreement (SLA) is an agreement between a provider of a service and clients of the service that defines quality of service (QoS) guarantees and obligations of both the clients and of the service. Improper placement of a new service can cause the new service to violate its SLA, or may cause existing services to violate their SLAs. Once an administrator determines that a new service or existing service violates an SLA associated with that service, the administrator typically manually chooses a new machine, and migrates the new or existing service to the new machine. This process may be repeated until no SLAs are violated.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for managing services in a distributed computing system. In one embodiment, components of a distributed computing system are monitored. The monitored components may include both hardware components and software components that operate on the hardware components. In one embodiment, at least one of the software components is a service that includes a service level agreement. Performance characteristics of the components are determined based on the monitoring. The performance characteristics of the service are compared to the service level agreement to determine whether the service level agreement has been violated. The service and/or an additional service collocated with the service may be migrated based on the performance characteristics of the components if the service level agreement has been violated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "determining", "comparing", "migrating", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
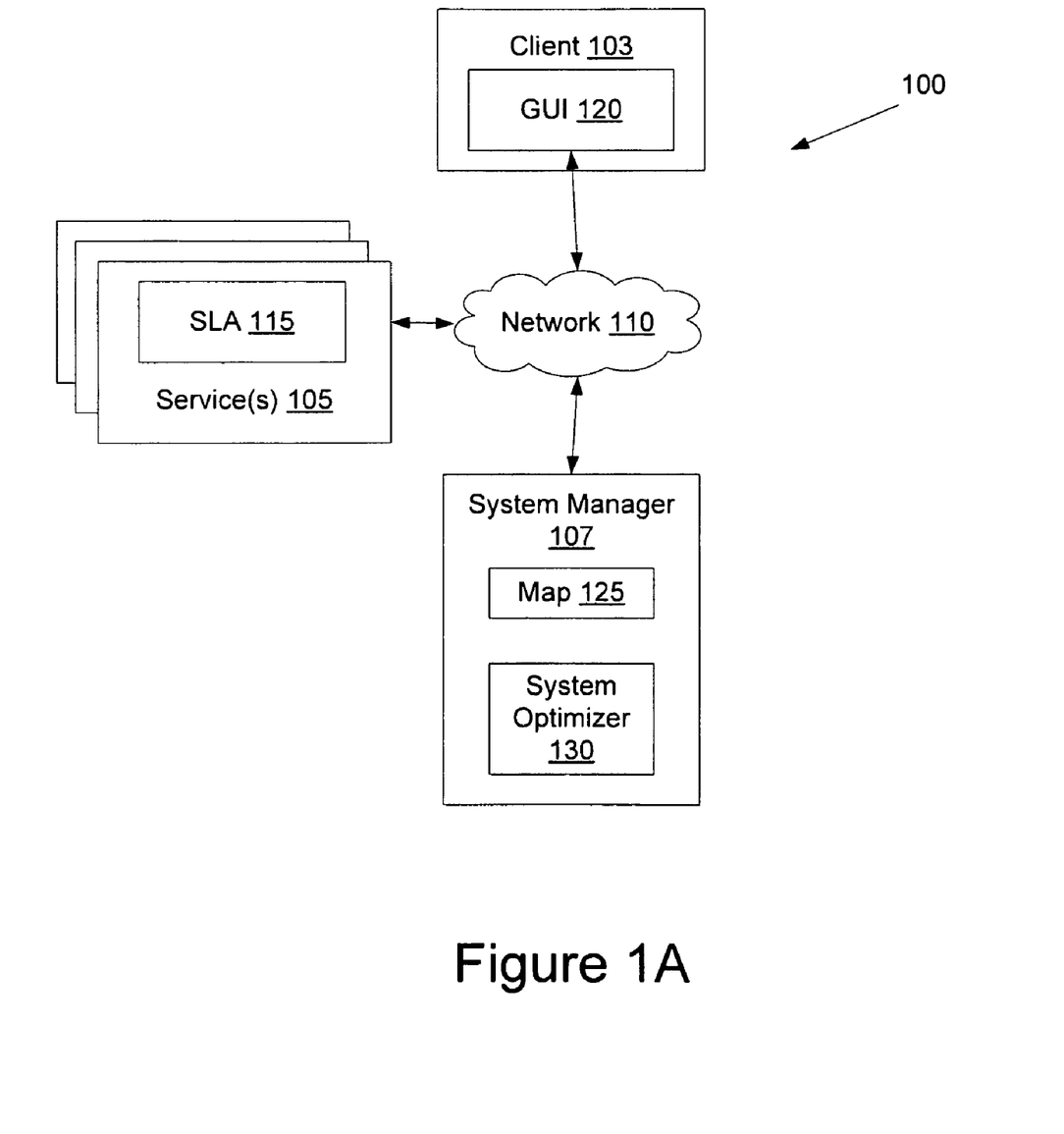
FIG. 1A illustrates an exemplary distributed computing system, in which embodiments of the present invention may operate.

FIG. 1A illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients (e.g., client 103) and services 105, connected via a network 110. The network 110 may be a public network (e.g., Internet), a private network (e.g., Ethernet or a local area Network (LAN)), or a combination thereof. In one embodiment, the network 110 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Client 103 may be, for example, a personal computer (PC), palm-sized computing device, personal digital assistant (PDA), etc. Client 103 may also be an application run on a PC, server, database, etc. In an SOA, client 103 includes an application that accesses services. Client 103 may be a fat client (client that performs local processing and data storage), thin client (client that performs minimal or no local processing and minimal to no data storage), or a hybrid client (client that performs local processing but little to no data storage).

In one embodiment, client 103 includes a graphical user interface (GUI) 120. Client 103 may use the GUI 120 to enable an administrator to monitor the distributed computing system 100. Through the GUI 120, an administrator may also perform management activities such as adding services to the distributed computing system 100, removing services from the distributed computing system 100, migrating (moving) services between machines and/or application servers on the distributed computing system 100, etc. In one embodiment, the graphical user interface 120 communicates with a system manager 107 (discussed in greater detail below). The GUI 120 may receive user input to perform a management function on a component of the distributed computing system 100 and transmit the user input to system manger 107. System manager 107 may then perform the management function that is received from the GUI 120.

Services 105 may be discretely defined sets of contiguous and autonomous functionality (e.g., business functionality, technical functionality, etc.). Services 105 may be resident on personal computers (PC), servers, routers, etc. Each service may represent a process, activity or other resource that can be accessed and used by other services or clients on network 110. Each service may be independent of other services, and may be accessed without knowledge of its underlying platform implementation.

In an example for a business function of "managing orders," services 105 may include, for example, create order, fulfill order, ship order, invoice order, cancel/update order, etc. Each such service may be autonomous from the other services that are used to manage orders, and may be remote from one another and have different platform implementations. However, the services 105 may be combined and used by one or more applications to manage orders.

Each service 105 may include a service level agreement (SLA) 115. Each service level agreement (SLA) 115 specifies an agreement between a provider of a service 105 and clients 103 of the service 105 that defines quality of service (QoS) guarantees and obligations of both the clients 103 and of the service 105. QoS guarantees include measurable properties relating to non-functional aspects of the service, such as availability, performance and reliability. Examples of QoS guarantees include guaranteed up time (e.g., guaranteed percentage of time available vs. time unavailable), guaranteed response time (e.g., guarantee that messages will be responded to within 5 ms 95% of the time), guaranteed number of messages per hour, and so on. Examples of service obligations include security obligations, transactional obligations, reporting obligations, logging obligations, etc. Likewise, client obligations may include, for example, security obligations and transactional obligations. An SLA 115 may also include a validity period, a list of clients to which it applies, a scope of the services to be provided (e.g., service operations covered in the SLA), penalties to apply if the QoS guarantees and/or obligations are not satisfied, and/or other parameters.

A service 105 may include multiple different SLAs 115, each being associated with a different client 103 or collection of clients. A service 105 may also include multiple SLAs 115 that are associated with the same client 103 or set of clients, but that apply to different service operations. For example, if a client 103 attempts to perform a first service operation, a first SLA may apply, and if the same client 103 attempts to perform a second service operation, a second SLA may apply. Alternatively, a service 105 may include only one SLA that applies to all clients 103 and to all service operations.

System manager 107 is a service that installs, moves, deletes, etc. services and other software (e.g., application servers) in the distributed computing system 100. System manager 107 runs on a computer such as a server, or personal computer that is connected to the network 110. System manager 107 can perform system management functions automatically, or based on user input. In one embodiment, system manager 107 receives user input from graphical user interface 120. Alternatively, system manager 107 may receive user input from a command line interface or graphical user interface that is installed on the system manager 107, or may operate automatically in the absence of received instructions.

In one embodiment, system manager 107 maintains a map 125 of the distributed computing system 100. The map 125 graphically shows components of the distributed computing system 100 (including hardware and software components) and relationships between the components. Such relationships may include physical relationships (e.g., machines that share the same location or power supply), service dependencies and/or other relationships (e.g., logical relationships). The map 125 may also show performance characteristics of the hardware and software components. Examples of performance characteristics of hardware components include processor speed, memory capacity, memory speed, etc. Examples of software performance characteristics include operating system version, up time, response time, mean time between failures, and so on. In one embodiment, system manager 107 stores the map 125 on a data store (not shown).

In one embodiment, system manager 107 imposes an administrative view on the map 125. The administrative view allows the available components to be represented on the map 125 using human understandable component names, component types, and/or component descriptions. The administrative view may be imposed, for example, by determining a service type for each service, and applying a human understandable service name based on the service type. The component type and/or component name may be determined by querying the available component and/or by querying a registry on the distributed computing system 100. Alternatively, component types and/or component names may be input by a user of the system manager 107.

System manager 107 includes a system optimizer 130. System optimizer 130 can identify performance characteristics of software components (e.g., services 105) and hardware components (e.g., machines on which services 105 operate) on the distributed computing system 100. The system optimizer 130 can then determine an optimal configuration of the distributed computing system, which includes an optimal placement of one or more software components on the hardware components. If the system optimizer 130 determines that a current placement of software components on the hardware components is not optimal, then system optimizer 130 may automatically migrate software components (e.g., services 105) between hardware components. System manager 107 and system optimizer 130 are discussed in greater detail below with reference to FIG. 1B.

Figure 1B:
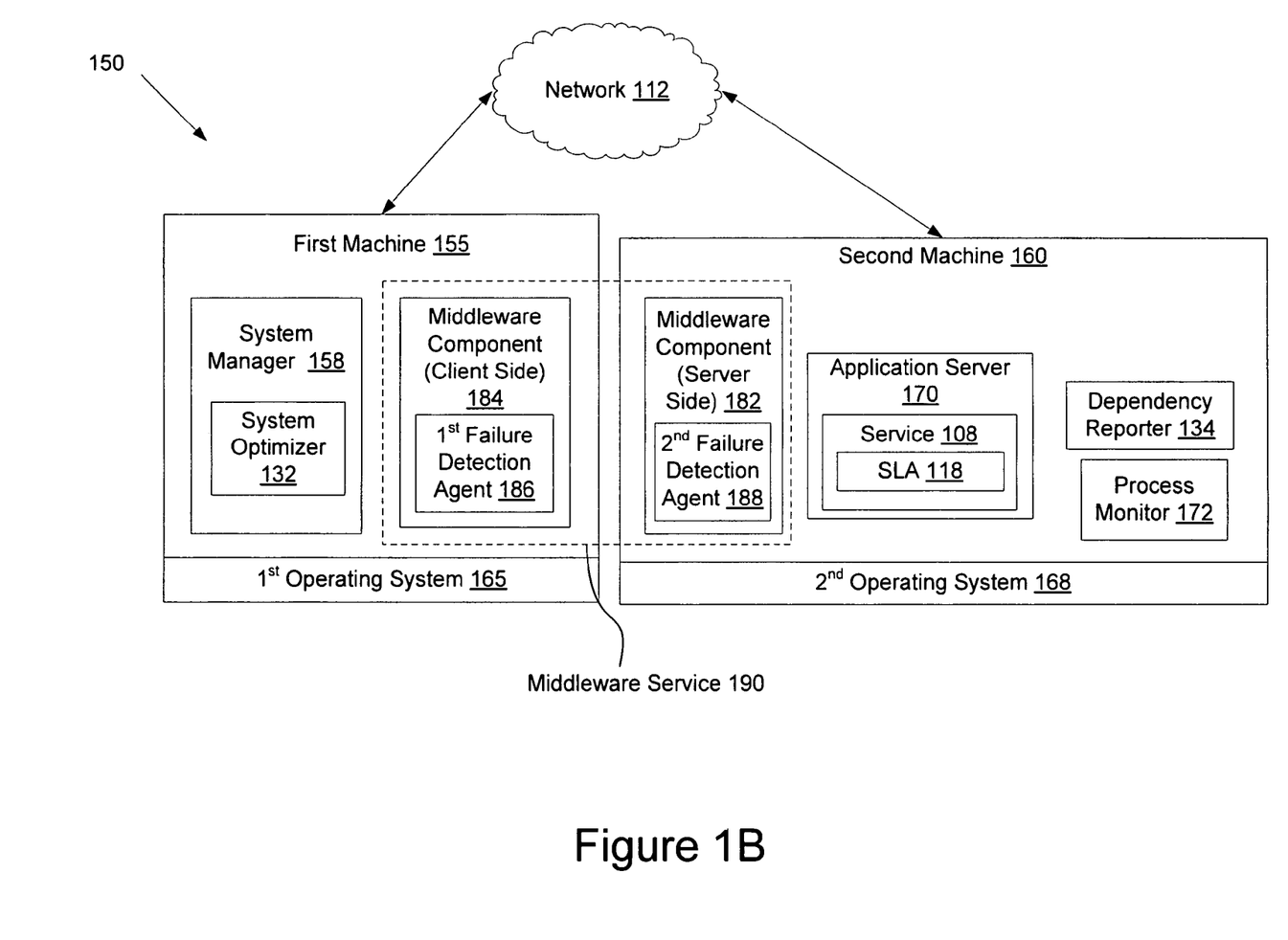
FIG. 1B illustrates another exemplary distributed computing system, in which embodiments of the present invention may operate.

FIG. 1B illustrates an exemplary distributed computing system 150, in which embodiments of the present invention may operate. The exemplary distributed computing system 150 includes software components and hardware components. Hardware components may include, for example, machines (e.g., servers or personal computers), data stores, or other hardware devices. Software components may include operating systems, application servers, virtual machines, services, or other software. In one embodiment, the distributed computing system 150 corresponds to distributed computing system 100 of FIG. 1A.

Exemplary distributed computing system 150 includes multiple machines (e.g., first machine 155 and second machine 160) connected via a network 112. Machines (e.g., first machine 155 and second machine 160) may be desktop computers, laptop computers, servers, etc. Each of the machines 155, 160 includes an operating system (e.g., first operating system 165 and second operating system 168) that manages an allocation of resources of the machine (e.g., by allocating memory, prioritizing system requests, controlling input and output devices, managing file systems, facilitating networking, etc.). Examples of operating systems that may be included in machines 155, 160 include Linux, UNIX, Windows®, OS X®, etc. Different machines may include different operating systems, and/or multiple machines may each include the same operating system. For example, first machine 155 and second machine 160 may each include Linux, or first machine 155 may include Linux and second machine 160 may include UNIX.

Software components such as an application server 170, virtual machine (not shown), hypervisor (not shown), service 108, etc. may operate on the operating systems 165, 168. Moreover, each of the services (e.g., service 108) may operate on a container (e.g., application server 170) that encapsulates business logic (e.g., logic that performs core concerns of an application or service) and/or on an operating system (e.g., second operating system 168). Containers may operate on virtual machines, which in turn may operate on the operating system and/or on a hypervisor. Any one of these components can act as a bottleneck, and cause a service to violate an SLA associated with the service.

In one embodiment, first operating system 165 includes a system manager 158, which may correspond to system manager 107 of FIG. 1A. System manager 158 may be an application that manages software components (e.g., services, containers, etc.). System manager 158 may be configured to obtain information about hardware and software components of the distributed computing system 150 from multiple different sources. For example, system manager 158 may obtain some information from a middleware service 190, and may obtain other information from process monitors 172 and/or dependency reporters 134 that may operate on machines that host services (e.g., service 108). System manager 158 may also obtain information directly from available services (e.g., service 108). Middleware service 190, dependency reporter 134 and process monitor 172 are described more fully below.

In one embodiment, system manager 158 includes a system optimizer 132 (which may correspond to system optimizer 130 of FIG. 1A) that acts on the information gathered by the system manager 158 to optimize the distributed computing system 150. The system optimizer 132 may identify performance characteristics of the software and hardware components, and migrate one or more software components between hardware components to optimize the distributed computing system 150. In one embodiment, system optimizer 132 determines whether any services are violating SLAs associated with the services (e.g., if service 108 violates SLA 118). If, for example, service 108 violates SLA 118, then system optimizer 132 may relocate either service 108 or another service (not shown) hosted by second machine 160. Such migration can change the performance characteristics so that service 108 no longer violates SLA 118.

In example, assume that a service is associated with an SLA that guarantees that the service will respond to all requests within 2 minutes. If the service only responds to requests within 2 minutes 80% of the time, then the service is in violation of the SLA. Therefore, system optimizer 132 may migrate the service to another machine (e.g., a faster machine and/or a machine that is underutilized) to cause the service to stop violating the SLA.

System optimizer 132 may also migrate software components even if no SLAs are violated to optimize the distributed computing system 150. In one embodiment, system optimizer 132 determines a first optimization value for a present configuration of the distributed computing system 150, and a second optimization value for a new configuration of the distributed computing system 150. The optimization values may be based on an average (e.g., a normalized average) of performance characteristics of the components of the distributed computing system 150. In one embodiment, the optimization values are based on weighted averages that weight more important performance characteristics more heavily than less important performance characteristics. If the second optimization value exceeds the first optimization value by a predetermined threshold, then system optimizer 132 may automatically migrate software components. Alternatively, system optimizer 132 may migrate components if any improvement is predicted. In one embodiment, system optimizer 132 continuously operates to optimize distributed computing system 150.

In one embodiment, system optimizer 132 determines an optimal configuration for the distributed computing system using a neural network. In another embodiment, the system optimizer 132 determines the optimal configuration using a Bayesian network. Alternatively, the system optimizer 132 may use other learning algorithms that can develop heuristics to determine on optimal configuration of the distributed computing system 150. To illustrate, an example heuristic may assign hardware components having high bandwidth, high idle time and high available memory to services for which timing is important (as identified in QoS guarantees in an SLA).

As the system optimizer 132 gathers data, it can identify relationships between different performance characteristics, and between additional variables and performance characteristics. The system optimizer 132 can then reorganize the distributed computing system (e.g., migrate software components) to improve important performance characteristics. For example, the system optimizer 132 may determine that a high processor speed and memory capacity are associated with faster response times. The system optimizer 132 may then determine that services having SLAs that require fast response times should be located on machines having a high processor speed and memory capacity. As the system optimizer 132 gains new information, it becomes increasingly effective at determining how software components should be placed on the hardware components for optimal configuration.

In one embodiment, upon determining that a software component should be optimized, system optimizer 132 notifies a system administrator that migration is recommended. The migration recommendation may include specifics of which software components should be migrated, and to which hardware components. In one embodiment, the system administrator can accept the recommended migration, causing the migration to be initiated. Alternatively, the system administrator may manually perform the migration (e.g., using GUI 120 of FIG. 1A).

System manager 158 can gather information pertaining to performance characteristics from multiple different sources. System manager 158 may obtain some information pertaining to performance characteristics directly from components. In one embodiment, available components are configured to send a status report to the system manager 158 when the component becomes available (e.g., when the component is started up). The available components may also periodically send status reports to the system manager 158 at a predetermined time interval, or when information included in the last status report has changed. Status reports may identify characteristics of the available component such as name, component type (e.g., machine, service, application server, etc.), or other component properties. Alternatively, or in addition, system manager 158 may scan the distributed computing system 150 to discover available components using a communication protocol such as, for example, simple network management protocol (SNMP).

In one embodiment, software components (e.g., service 108) are configured to periodically inform system manager 158 and/or middleware service 190 of a current status of work being performed. Such periodic updates may identify operations that have already been performed, operations that are to be performed, and an estimated time to completion. Such periodic updates may also identify whether a response message has already been sent, whether a thread executing the procedure has failed, or other additional information.

In one embodiment, software components are collocated with a process monitor (e.g., process monitor 172). Process monitor 172 monitors the activities of applications and services with which it is collocated and may report these activities to the system manager 158. Process monitor 172 may gather operating statistics of applications and/or services. Process monitor 172 may also monitor each application and/or service to determine a current functionality of the monitored applications and/or services. The process monitor 172 can monitor file system, registry, process and thread information. In the illustrated exemplary distributed computing system 150, process monitor monitors service 108.

To facilitate networking, each operating system 165, 168 may include a middleware component (e.g., client side middleware component 184 and server side middleware component 182) that facilitates the exchange of messages between the first machine 155 and the second machine 160. The middleware components 182, 184 are components of a middleware service 190. The Middleware service 190 provides a layer of interconnection between processes, applications, services, etc. over network 112. For example, the middleware service 190 may enable system manager 158 to interact with service 108.

Examples of middleware services include remote procedure calls (RPC), message oriented middleware (MOM), object request brokers (ORB), enterprise service bus (ESB), etc. A remote procedure call (RPC) enables an application (e.g., client 130) to cause a subroutine or procedure to execute in an address space that is different from an address space in which the application is running. For example, a remote procedure call could permit system manager 158 to cause service 108 to execute a procedure (e.g., to perform one or more operations). Message oriented middleware (MOM) is a client/server infrastructure that allows an application to be distributed over multiple machines, each of which may be running the same or different operating systems. Object request brokers (ORB) enable applications to make program calls between machines over a network. The most common implementation of an ORB is the common object request brokerage architecture (CORBA). Enterprise service buses (ESB) are described above.

Each service 108 may be collocated with a failure detection agent (e.g., second failure detection agent 188), which monitors failures of services, application servers, virtual machines and/or other software components down to the thread level. In one embodiment, the client side middleware component 184 includes a first failure detection agent 186, and the server side middleware component 182 includes a second failure detection agent 188. Middleware service 190 may provide failure detection capabilities via one or both of first failure detection agent 186 and second failure detection agent 188. In one embodiment, first failure detection agent 186 and second failure detection agent 188 perform both course grained failure detection and fine grained failure detection. Course grained failure detection may include detecting a status of second machine 160, second operating system 168 and/or service 108. Fine grained failure detection may include determining a status of application server 170 and/or one or more threads of service 108. Fine grained failure detection may also include determining whether service 108 has received a request message, whether a thread within service 108 has processed the request message, whether the service 108 has sent a response message, etc. Moreover, each of the first failure detection agent 186 and second failure detection agent 188 can determine when an action has occurred (e.g., when a message was received, when a thread has processed a message, when a response message has been sent, when a failure has occurred, etc.).

First failure detection agent 186 and second failure detection agent 188 may operate independently or together. In one embodiment, some failure detection capabilities are provided by first failure detection agent 186, while other failure detection capabilities are provided by second failure detection agent 188. For example, some failure detection capabilities may only be performed by a failure detection agent that is external to a machine that hosts a process that is of concern, while other failure detection capabilities may only be provided by a failure detection agent that is hosted by the same machine that hosts the process that is of concern. Therefore, if service 108 is the process of concern, then first failure detection agent 186 may, for example, be able to detect whether second machine 160 and/or second operating system 168 are operable, while second failure detection agent 188 may not have such a capability. Alternatively, all failure detection capabilities may be provided by each failure detection agent.

The middleware service 190 may perform failure detection on behalf of system manager 158 for all services, machines, software and hardware components on the distributed computing system. In one embodiment, failure detection is performed upon request from a client and/or from system manager 158. Alternatively, middleware service 190 may automatically initiate and/or continuously perform failure detection.

In one embodiment, the application server 170 operates within a virtual machine (e.g., the Java Virtual Machine). In such an embodiment, middleware service 190 may also probe the virtual machine to determine whether the virtual machine has failed. The virtual machine may include multiple application servers, each of which may be probed by middleware service 190. Additionally, each virtual machine may include an additional operating system running within it, and the operating system may include multiple application servers. Middleware service 190 may probe each of these components to determine whether they are operational. In one embodiment, middleware service 190 communicates with an additional process monitor within the virtual machine to determine status information of application servers, services and/or threads that operate within the virtual machine.

In addition to gathering performance characteristics of hardware components and software components, system manager 158 may also gather information on additional variables that can affect the performance characteristics. One such variable is service dependency. It can be beneficial to track dependencies between services to gain an understanding of the needs of individual clients and services within the distributed computing system 150. Known dependencies may be used, for example, to intelligently migrate services between locations within the distributed computing system 150, or to track most likely points of failure within the distributed computing system 150.

In one embodiment, each of the services (e.g., service 108) includes and/or is associated with (e.g., collocated with) a dependency reporter 134. The dependency reporter 134 tracks when the service is called by, or makes calls to, other services. When the dependency reporter 134 detects that a service calls (invokes) another service, or is called by another service, it logs the identities of the service being called and the service making the call. The identity of a service may include, for example, a process identifier (e.g., a unique Java virtual machine (JVM) in Java, or a unique Unix process in C++ on Unix) of the service or of a process on which the service is running. The identity may also include an identification of an object, procedure, function, etc. running within a process.

Each invocation/call detected by a dependency reporter 134 represents a dependency, in which the service making the call is dependent upon the service being called. These dependencies can be tracked by system manager 158 by keeping an up-to-date status of service dependencies. In one embodiment, the dependency reporter 134 transmits detected invocations to the system manager 158. Alternatively, the dependency reporter 134 may maintain the detected invocations in a dependency log (not shown) or dependency database (not shown). System manager 158 may determine dependencies from the dependency logs and/or a dependency database to identify service dependencies.

Figure 2A:
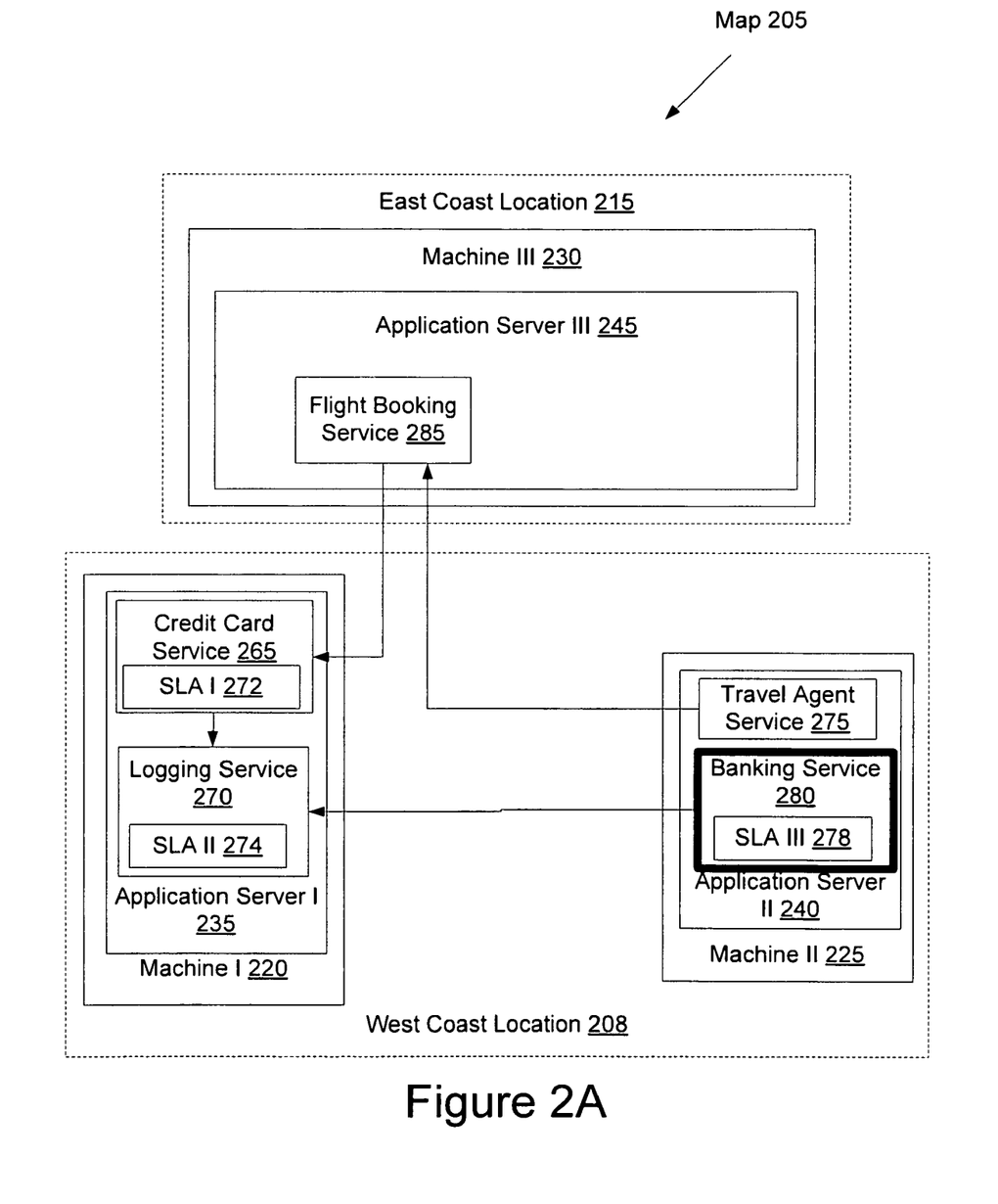
FIG. 2A illustrates a map of an exemplary distributed computing system before optimization.
Figure 2B:
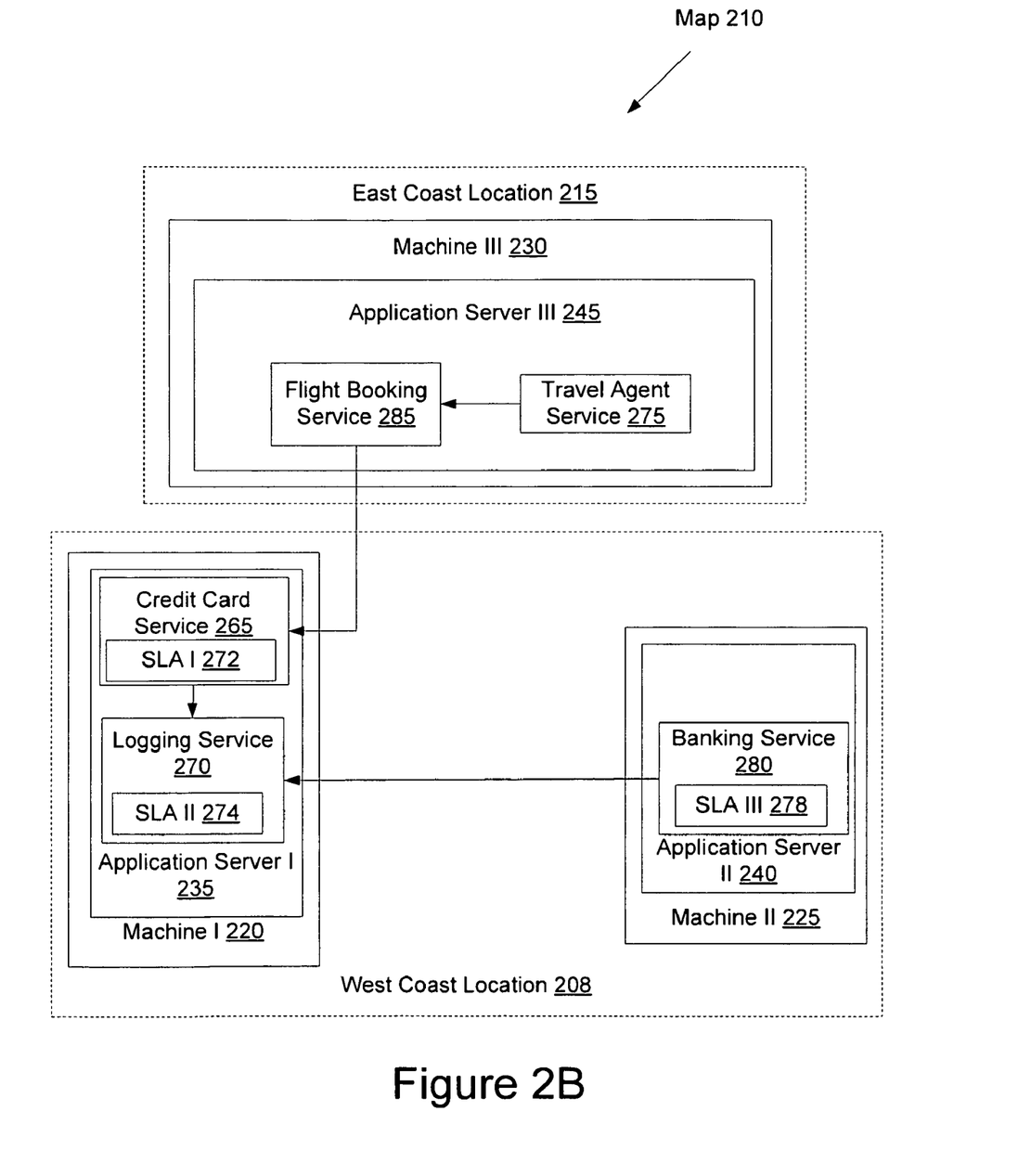
FIG. 2B illustrates another map of the distributed computing system after optimization.

FIGS. 2A-2B illustrate an exemplary distributed computing system before and after performing system optimization, respectively, in accordance with embodiments of the present invention. FIG. 2A illustrates a map 205 of the exemplary distributed computing system before optimization. The map 205 shows available components of the distributed computing system, including hardware components (e.g., machine I 220, machine II 225 and machine III 230) and software components (e.g., credit card service 265, logging service 270, travel agent service 275, banking service 280, flight booking service 285, application server I 235, application server II 240 and application server III 245). The map 205 also illustrates relationships such as physical relationships and dependencies between available components. For example, the map 205 shows that machine I 220 and machine II 225 are both located at a West Coast location 208 and that machine III 230 is located at an East Coast location 215. The map 205 also shows that application server I 235 operates on machine I 220, that application server II 240 operates on machine II 225 and that application server III 245 operates on machine III 230. Additionally, the map 205 shows that credit card service 265 and logging service 270 operate on application server I 235, that travel agent service 275 and banking service 280 operate on application server II 240, and that flight booking service 285 operates on application server III 245. The map 205 may also show, for example, dependencies of machines to data stores, of machines to power supplies, and so on.

In one embodiment, map 205 shows dependencies between services. For example, map 205 shows that credit card service 265 depends on logging service 270 using an arrow. Likewise, flight banking service 280 depends on logging service 270, travel agent service 275 depends on flight booking service 285, and flight booking service 185 depends on credit card service 265. In one embodiment, a degree of dependency is illustrated by the thickness of the arrows, such that thicker arrows represent stronger dependencies. Alternatively, the degree of dependency between services may be represented by numerical dependency ratings or other graphical or textual representations of a dependency rating.

In one embodiment, each of the components are represented in a graphical user interface (e.g., GUI 120 of FIG. 1A) by icons and/or names that uniquely identify those services and components. Components of the same type may be represented by like icons, and differentiated based on names. Components that operate on other available components may be shown as icons nested within additional icons representing the available components that they depend on. For example, separate icons for the credit card service 265 and logging service 270 may be shown as nested within an icon representing application server I 235, which in turn may be shown as nested within an icon representing machine I 220. All types of available components may be shown in the GUI at a single time. Alternatively, one or more levels of available components may be shown, with the other levels hidden. For example, only application servers may be illustrated, only machines may be illustrated, only services may be illustrated, etc.

In the illustrated map 205, credit card service 265 includes a SLA I 272, logging service 270 includes a SLA II 274 and banking service 280 includes a SLA III 278. Both credit card service 265 and logging service 270 are meeting the service obligations and QoS guarantees set forth by their respective SLAs. However, banking service 280 is in violation of one or more service obligations and/or QoS guarantees set forth by SLA III 278. This violation is shown in map 205 by a thick border around block representing the banking service 280. However, if a graphical user interface is used to display map 205, other mechanisms may be used to illustrate services that are in violation of SLAs (e.g., showing violating services in red, using different icons to represent violating services, etc.).

Once it is determined that a service is in violation of its SLA, a system optimizer 132 determines how to adjust a configuration of the distributed computing system to ensure that no services will violate their SLAs. The system optimizer 132 may then migrate one or more services to obtain an optimal configuration of the distributed computing system 150.

Referring to FIG. 2B, another map 215 of the distributed computing system shown in map 210 of FIG. 2A is shown in which the travel agent service 275 is migrated to application server III 245. When a service is to be migrated, the code and data that makes up the service is packaged. Packaging may include placing the code and data into a single file or folder, compressing the code and data, etc. The package is then uploaded to and installed at the new location (e.g., on a new machine and/or application server). Once the service has been successfully deployed to the new available component, the original version may be deleted.

As shown in map 210, after travel agent service 275 was migrated to application server III 245, banking service 280 was no longer in violation of SLA III 278. Similarly, the system optimizer may have determined that optimal performance would be achieved if banking service 280 was migrated to application server III 245 rather than travel agent service 275. Alternatively, system optimizer may have determined that optimal configuration would be achieved by migrating flight booking service 285 to application server II 240 and migrating banking service 280 to application server III 245.

Figure 3:
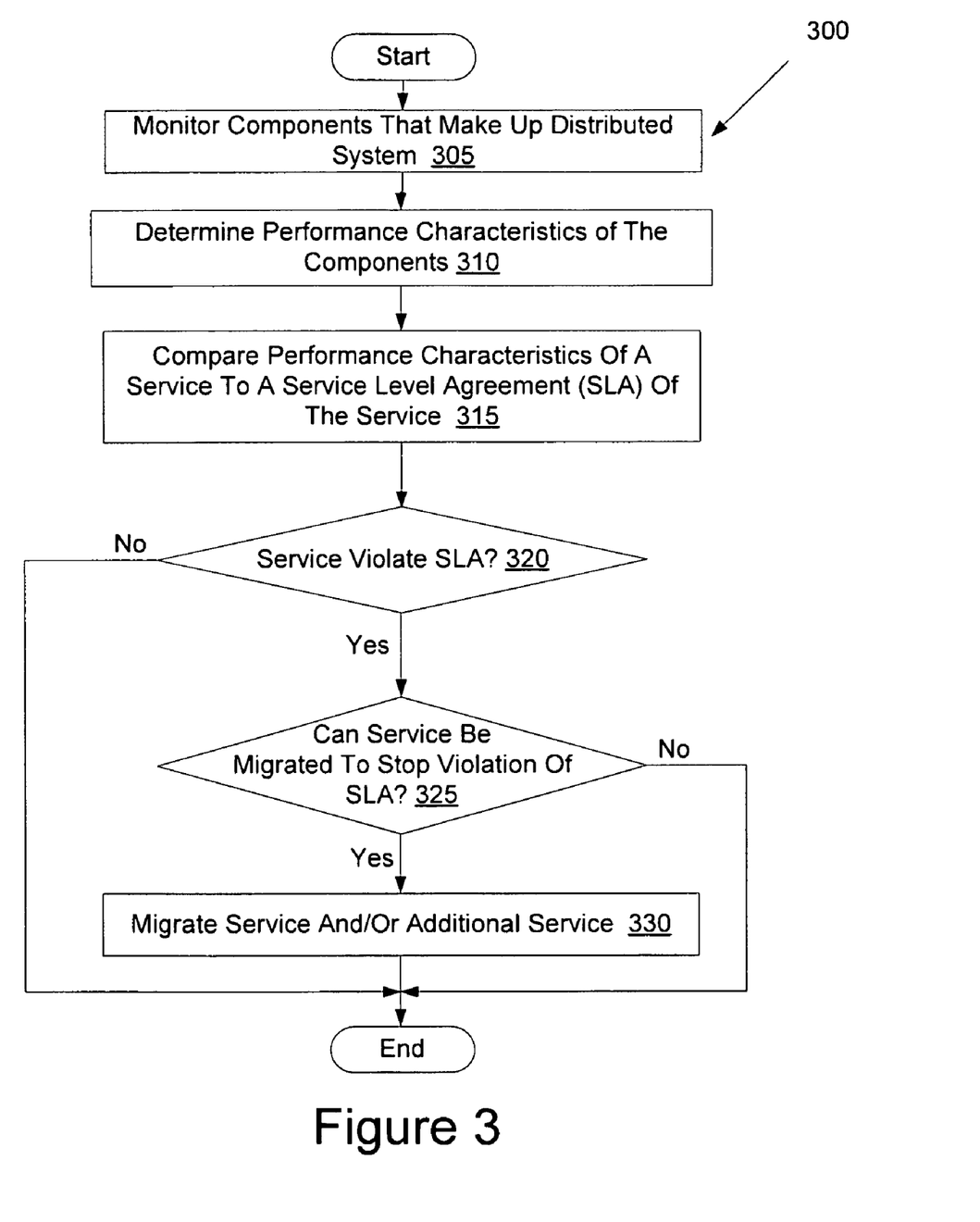
FIG. 3 illustrates a flow diagram of one embodiment for a method of optimizing a distributed computing system.

In some instances, the system optimizer may determine that an optimal configuration of the distributed computing system will be achieved by migrating a service to a machine that does not have software components that are necessary to run that service. In such an instance, those unavailable software components on which the selected service depends may automatically be installed on the machine. The unavailable software components may be deployed prior to deployment of the selected service, or concurrent to the selected service FIG. 3 illustrates a flow diagram of one embodiment for a method 300 of optimizing a distributed computing system. The method is performed by processing logic that comprises hardware (e.g., circuitry, dedicated logic, programmable logic, microcode, etc.), software (such as instructions run on a processing device), or a combination thereof. In one embodiment, method 300 is performed by system optimizer 130 and/or system manager 107 of distributed computing system 100 of FIG. 1A.

Referring to FIG. 3, at block 305 a system manager monitors components that make up a distributed computing system. The components may include both hardware components and software components. The available components may be monitored based on status reports received from the components, by scanning the distributed computing system (e.g., using SNMP), based on information gathered by a middleware service, a process monitor, a dependency reporter, etc. At block 310, the system manager determines performance characteristics of the monitored components based on gathered information. Examples of performance characteristics of hardware components includes, processor speed, memory capacity, memory speed, etc. Examples of software performance characteristics include operating system version, up time, response time, mean time between failures, and so on.

At block 315, a system optimizer compares the performance characteristics of a service to a service level agreement of the service. At block 320, if one or more of the performance characteristics indicate that the service is in violation of its SLA, then the method proceeds to block 325. If the service is not in violation of its SLA, the method ends.

At block 325, the system optimizer determines how to optimize the distributed computing system so that the service no longer violates its SLA. If the system optimizer determines a configuration of the distributed computing system that will cause the service to stop violating its SLA, and that will not cause any other services to violate associated SLAs, then the method continues to block 330. If no such configuration can be found, the method ends.

At block 330, the system optimizer migrates the service or an additional service to achieve the determined configuration. Migrating the service may include packaging the service (including placing code and data for the service into a single file or folder and compressing the code and data), uploading the package to a new machine, and installing the service on the new machine and/or on a new application server.

Figure 4:
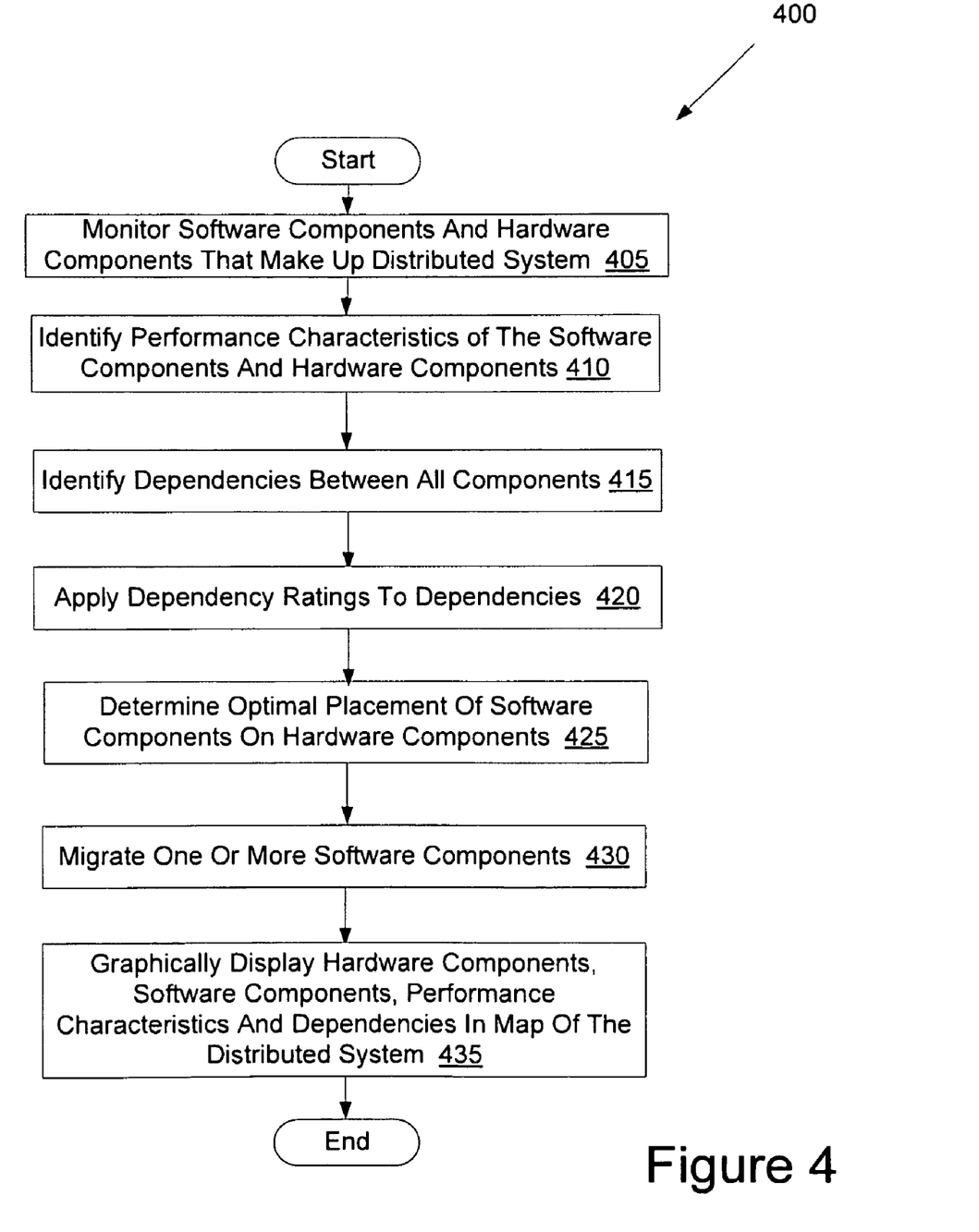
FIG. 4 illustrates a flow diagram of another embodiment for a method of optimizing a distributed computing system.

FIG. 4 illustrates a flow diagram of another embodiment for a method 400 of optimizing a distributed computing system. The method is performed by processing logic that comprises hardware (e.g., circuitry, dedicated logic, programmable logic, microcode, etc.), software (such as instructions run on a processing device), or a combination thereof. In one embodiment, method 400 is performed by system optimizer 130 and/or system manager 107 of distributed computing system 100 of FIG. 1A.

Referring to FIG. 4, at block 405 the system manager monitors hardware and software components that make up a distributed computing system. At block 410, the system manager determines performance characteristics of the monitored components based on gathered information. At block 415, a system manager identifies dependencies between components. The dependencies may include dependencies between software components (e.g., dependencies of services to services or of services to application servers) and dependencies of software components to hardware components. At block 420, the system manager applies dependency ratings to the dependencies. The dependency ratings indicate the degree to which a component depends on another component. In one embodiment, a higher dependency rating indicates that a component is more dependent upon another component. For example, if a service makes calls to another service infrequently (e.g., a few times a year), then the dependency between the services may be low, and may have a low dependency rating.

At block 425, a system optimizer determines an optimal configuration of the distributed computing system (e.g., optimal placement of software components on hardware components). In one embodiment, system optimizer bases optimal configuration on performance characteristics of hardware components and software components using a neural network or Bayesian network. In such an optimal configuration, no services violate service level agreements associated with those services, and software components are placed for maximum efficiency. For example, in an unoptimized configuration, some machines may be idle much of the time, while other machines may be operating at maximum capacity. Optimizing the distributed computing system may redistribute the workloads so that no machines are operating at maximum capacity, and no machines are idle.

System optimizer may also base optimization on component dependencies. For example, if a first service is highly dependent upon a second service (e.g., makes frequent calls to the second service), an optimal configuration may place both the first service and the second service on a single machine. By placing the services on the same machine, network bandwidth usage may be reduced, and message transmission speeds between the services may be increased.

At block 430, the system optimizer migrates one or more software components (e.g., services and/or application servers). The method may then end.

Optionally, at block 435, a graphical user interface may graphically display the hardware components, software components, performance characteristics and dependencies in a map of the distributed computing system. In addition to being performed after software components have been migrated, block 435 may also be performed before migration (e.g., after block 420).

Figure 5:
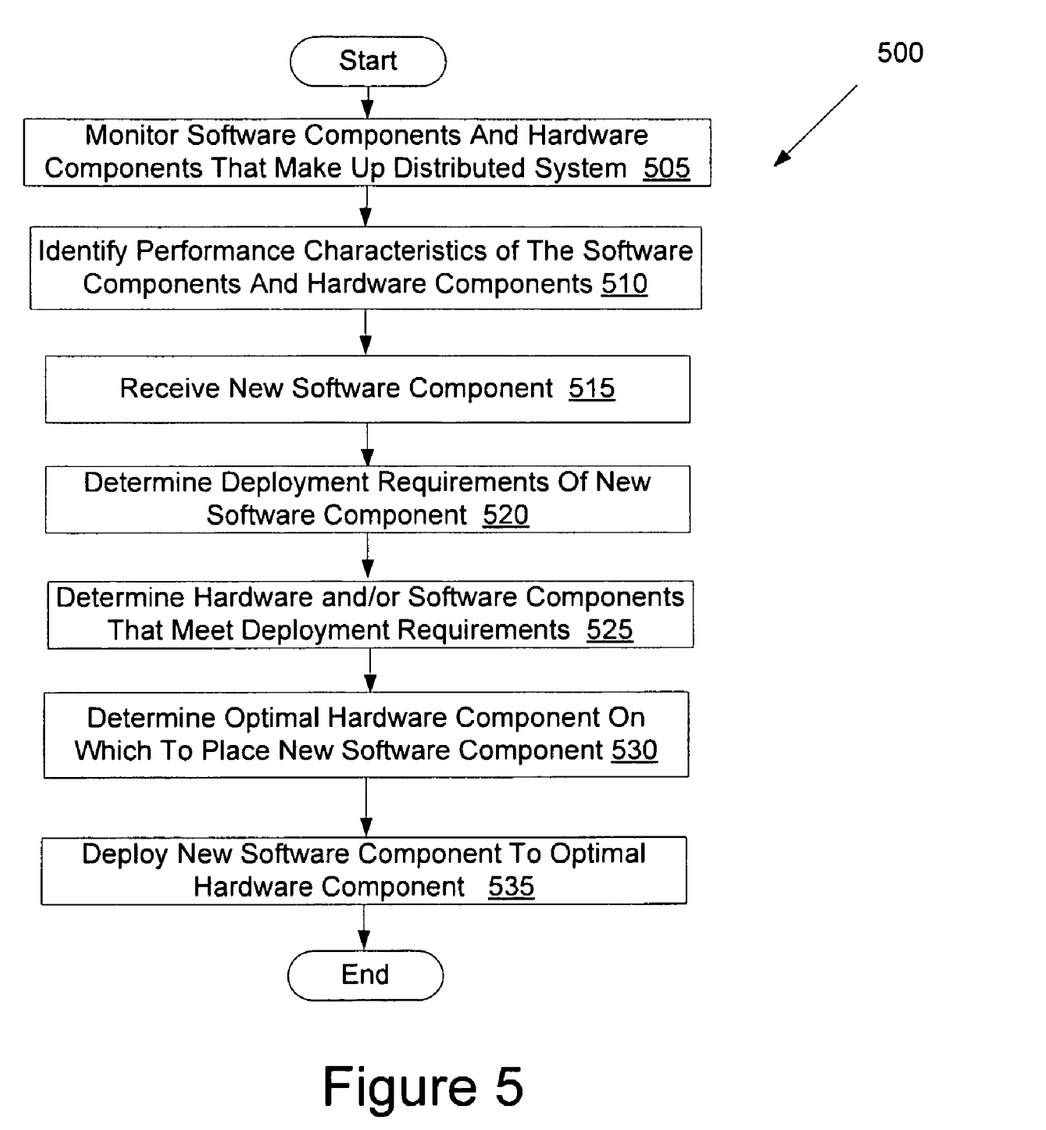
FIG. 5 illustrates a flow diagram of yet another embodiment for a method of optimizing a distributed computing system.

FIG. 5 illustrates a flow diagram of yet another embodiment for a method 500 of optimizing a distributed computing system. The method is performed by processing logic that comprises hardware (e.g., circuitry, dedicated logic, programmable logic, microcode, etc.), software (such as instructions run on a processing device), or a combination thereof. In one embodiment, method 500 is performed by system optimizer 130 and/or system manager 107 of distributed computing system 100 of FIG. 1A.

Referring to FIG. 5, at block 505 a system manager monitors hardware and software components that make up a distributed computing system. At block 510, the system manager determines performance characteristics of the monitored components based on gathered information.

At block 515, a new software component that is to be deployed on the distributed computing system is received. At block 520, a system optimizer determines deployment requirements of the new software component. For example, if the new software component is a service that includes a service level agreement (SLA), then processing logic may identify each service obligation included in the SLA. The system optimizer may then determine what performance characteristics are necessary to satisfy the service obligations. A received software component may also depend on other software components that are not installed on the distributed computing system. The system optimizer may determine what other software components should be installed for the received software component to operate.

At block 525, the system optimizer determines hardware and/or software components that meet the deployment requirements. For example, if the system optimizer determined that particular performance characteristics were necessary to satisfy service obligations and/or QoS guarantees included in an SLA, then the system optimizer may identify those components that meet the necessary performance characteristics.

At block 530, the system optimizer determines an optimal hardware component on which to place the new software component. Such a determination may be made based on the performance characteristics and/or an SLA associated with the new software component. Typically, the optimal hardware component will be one of the hardware components that meet the deployment requirements. In one embodiment, determining the optimal hardware component on which to place the new software component includes determining an overall optimal configuration of the distributed computing system. For example, the system optimizer may determine that optimal configuration may be achieved by deploying the new software component to a first hardware component and moving a deployed software component from the first hardware component to a second hardware component.

At block 535, the system optimizer deploys the new software component to the optimal hardware component. The system optimizer may also migrate already deployed software components between hardware components. The method then ends.

Figure 6:
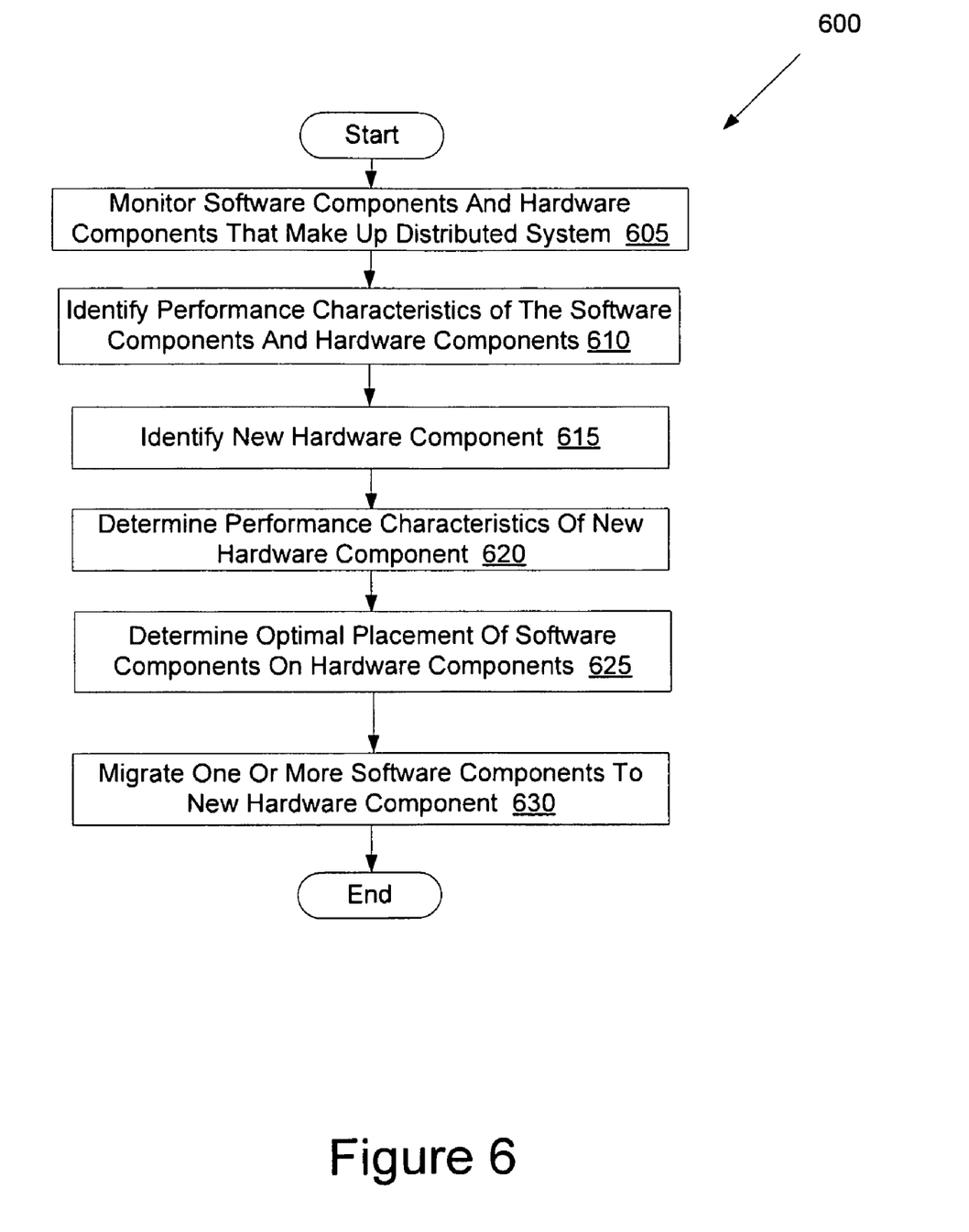
FIG. 6 illustrates a flow diagram of still yet another embodiment for a method of optimizing a distributed computing system.

FIG. 6 illustrates a flow diagram of still yet another embodiment for a method 600 of optimizing a distributed computing system. The method is performed by processing logic that comprises hardware (e.g., circuitry, dedicated logic, programmable logic, microcode, etc.), software (such as instructions run on a processing device), or a combination thereof. In one embodiment, method 600 is performed by system optimizer 130 and/or system manager 107 of distributed computing system 100 of FIG. 1A.

Referring to FIG. 6, at block 605 a system manager monitors hardware and software components that make up a distributed computing system. At block 610, performance characteristics of the monitored components are determined based on gathered information.

At block 615, the system manager identifies a new hardware component that has been installed on the distributed computing system. The system manager may receive an identification of the new hardware component from a system administrator and/or from the hardware component itself. Alternatively, the system manager may identify the new hardware component based on a scan of the distributed computing system (e.g., using SNMP). At block 620, the system manager determines performance characteristics of the new hardware component.

At block 625, a system optimizer determines an optimal configuration of the distributed computing system (e.g., optimal placement of the software components on the hardware components). The optimal configuration includes one or more software components being deployed to the new hardware component. At block 630, the system optimizer migrates the one or more software components to the new hardware component. The method then ends.

Though methods 300-600 have been described in terms of a system manager and a system optimizer performing specific actions represented in blocks, it should be understood that these actions may also be performed by other processing logic. For example, actions that are described as being performed by a system manager may instead be performed by a system optimizer, and vice versa.

Figure 7:
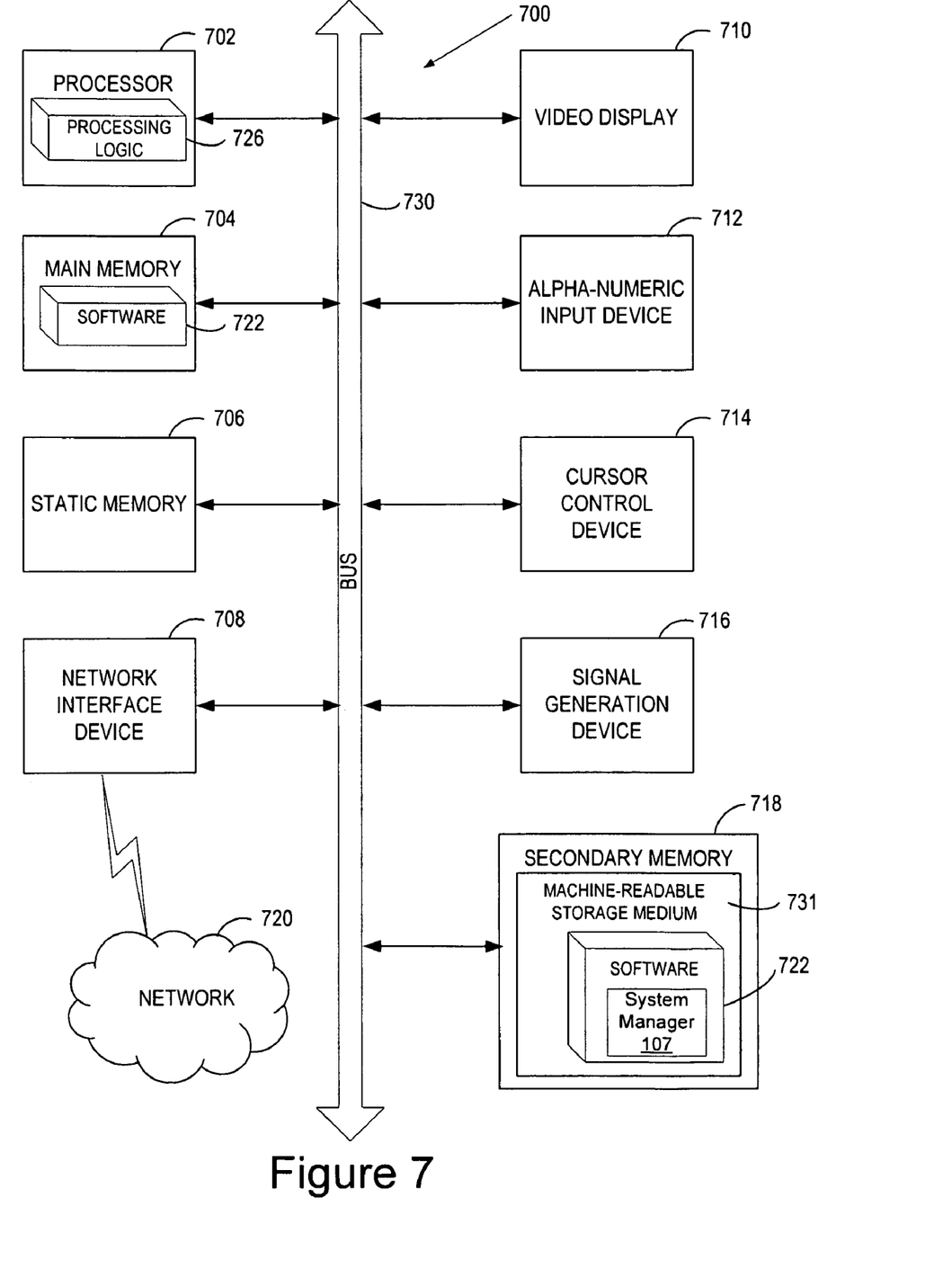
FIG. 7 illustrates a block diagram of an exemplary computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

The machine-readable storage medium 731 may also be used to store a system optimizer 130 and/or system manager 107 of FIG. 1A), and/or a software library containing methods that call a system optimizer 130 and/or system manager 107. While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method of managing services, comprising:
    monitoring components of a distributed computing system by a server, the components comprising hardware components and software components that operate on the hardware components, wherein at least one of the software components is a service that comprises a service level agreement;
    determining performance characteristics of the components based on the monitoring;
    comparing the performance characteristics of the service to the service level agreement to determine whether the service level agreement has been violated; and
    migrating at least one of the service or an additional service collocated with the service based on the performance characteristics of the components if the service level agreement has been violated.

2. The method of claim 1, further comprising:
    determining optimal placement of the software components on the hardware components based on the performance characteristics of the components using at least one of a Bayesian network or a neural network; and
    migrating at least one of the software components to achieve the determined optimal placement.

3. The method of claim 1, further comprising:
    graphically displaying the components, the performance characteristics, and dependencies between the components in a map of the distributed computing system.

4. The method of claim 1, further comprising:
    receiving a new service having a new service level agreement;
    determining an optimal hardware component on which to deploy the new service based on the new service level agreement and the performance characteristics; and
    deploying the new service to the optimal hardware component.

5. The method of claim 4, further comprising:
    determining deployment requirements of the new service based on the new service level agreement;
    determining components that meet the deployment requirements based on the performance characteristics; and
    graphically indicating on a map of the distributed computing system the components that meet the deployment requirements.

6. The method of claim 1, further comprising:
   identifying dependencies between the components of the distributed computing system; and
   applying dependency ratings to the dependencies.

7. A computer readable storage medium including instructions that, when executed by a processing system, cause the processing system to perform a method of managing services, the method comprising:
   monitoring components of a distributed computing system, the components comprising hardware components and software components that operate on the hardware components, wherein at least one of the software components is a service that comprises a service level agreement;
   determining performance characteristics of the components based on the monitoring;
   comparing the performance characteristics of the service to the service level agreement to determine whether the service level agreement has been violated; and
   migrating at least one of the service or an additional service collocated with the service based on the performance characteristics of the components if the service level agreement has been violated.

8. The computer readable storage medium of claim 7, the method further comprising:
   determining optimal placement of the software components on the hardware components based on the performance characteristics of the components using at least one of a Bayesian network or a neural network; and
   migrating at least one of the software components to achieve the determined optimal placement.

9. The computer readable storage medium of claim 7, the method further comprising:
   graphically displaying the components, the performance characteristics, and dependencies between the components in a map of the distributed computing system.

10. The computer readable storage medium of claim 7, the method further comprising:
    receiving a new service having a new service level agreement;
    determining an optimal hardware component on which to deploy the new service based on the new service level agreement and the performance characteristics; and
    deploying the new service to the optimal hardware component.

11. The computer readable storage medium of claim 10, the method further comprising:
    determining deployment requirements of the new service based on the new service level agreement;
    determining components that meet the deployment requirements based on the performance characteristics; and
    graphically indicating on a map of the distributed computing system the components that meet the deployment requirements.

12. The computer readable storage medium of claim 7, the method further comprising:
    identifying dependencies between the components of the distributed computing system; and
    applying dependency ratings to the dependencies.

13. A computing apparatus that is a component of a distributed computing system, comprising:
    a memory comprising instructions to managing services that are deployed in the distributed computing system; and
    a processor, connected with the memory, to execute the instructions, wherein the instructions cause the processor to:
        monitor components of the distributed computing system, the components comprising hardware components and software components that operate on the hardware components, wherein at least one of the software components is a service that comprises a service level agreement;
        determine performance characteristics of the components based on the monitoring;
        compare the performance characteristics of the service to the service level agreement to determine whether the service level agreement has been violated; and
        migrate at least one of the service or an additional service collocated with the service based on the performance characteristics of the components if the service level agreement has been violated.

14. The computing apparatus of claim 13, the instructions further to cause the processor to:
    determine optimal placement of the software components on the hardware components based on the performance characteristics of the components using at least one of a Bayesian network or a neural network; and
    migrate at least one of the software components to achieve the determined optimal placement.

15. The computing apparatus of claim 13, further comprising:
    a graphical user interface, connected with the processor, to graphically display the components, the performance characteristics, and dependencies between the components in a map of the distributed computing system.

16. The computing apparatus of claim 13, the instructions further to cause the processor to:
    receive a new service having a new service level agreement;
    determine an optimal hardware component on which to deploy the new service based on the new service level agreement and the performance characteristics; and
    deploy the new service to the optimal hardware component.

17. The computing apparatus of claim 16, the instructions further to cause the processor to:
    determine deployment requirements of the new service based on the new service level agreement;
    determine components that meet the deployment requirements based on the performance characteristics; and
    graphically indicating on a map of the distributed computing system the components that meet the deployment requirements.

18. The computing apparatus of claim 13, the instructions further to cause the processor to:
    identify dependencies between the components of the distributed computing system; and
    apply dependency ratings to the dependencies.

* * * * *